(12) United States Patent
Levesque et al.

(10) Patent No.: US 11,136,142 B2
(45) Date of Patent: Oct. 5, 2021

(54) RETRACTABLE RUNWAY EDGE SHEAVE

(71) Applicant: Engineered Arresting Systems Corporation, Aston, PA (US)

(72) Inventors: Christopher J. Levesque, Glenolden, PA (US); Daniel Glenn Warrick, Philadelphia, PA (US); Kirk F. Schneider, Springfield, PA (US); Kenneth J. Neeld, West Chester, PA (US)

(73) Assignee: ENGINEERED ARRESTING SYSTEMS CORPORATION, Aston, PA (US)

( * ) Notice: Subject to any disclaimer, the term of this patent is extended or adjusted under 35 U.S.C. 154(b) by 159 days.

(21) Appl. No.: 16/402,608

(22) Filed: May 3, 2019

(65) Prior Publication Data

US 2019/0337639 A1 Nov. 7, 2019

Related U.S. Application Data

(60) Provisional application No. 62/666,404, filed on May 3, 2018.

(51) Int. Cl.
*B64F 1/02* (2006.01)
*B64C 25/68* (2006.01)

(52) U.S. Cl.
CPC .............. *B64F 1/029* (2020.01); *B64C 25/68* (2013.01)

(58) Field of Classification Search
CPC . B64F 1/02; B64F 1/029; B64C 25/32; B64C 25/68

USPC ...................................................... 244/110 C
See application file for complete search history.

(56) References Cited

U.S. PATENT DOCUMENTS

| | | | | |
|---|---|---|---|---|
| 2,626,768 | A | * | 1/1953 | Shank ................ B64C 25/68 244/110 G |
| 2,919,871 | A | | 1/1960 | Sorensen |
| 3,146,974 | A | | 9/1964 | Petoia |
| 3,350,039 | A | | 10/1967 | Crater |
| 3,620,489 | A | | 11/1971 | Riblett, Jr. |
| 4,441,672 | A | | 4/1984 | Aglae et al. |
| 6,981,673 | B1 | * | 1/2006 | Sowell ................ B64F 1/029 244/110 C |

FOREIGN PATENT DOCUMENTS

EP    1235713 A1    9/2002

OTHER PUBLICATIONS

International Patent Application No. PCT/US2019/030544, International Searching Authority and Written Opinion of the International Searching Authority, dated May 28, 2020.
(Continued)

*Primary Examiner* — Brady W Frazier
(74) *Attorney, Agent, or Firm* — Kilpatrick Townsend & Stockton LLP

(57) ABSTRACT

A retractable runway edge sheave for use in an aircraft arresting system. The arresting system functions to extend a cable across a runway for capture by a tailhook of an aircraft. The retractable runway edge sheave is designed to raise and lower the cable. The disclosed system may also feature a ramping system.

14 Claims, 17 Drawing Sheets

(56) References Cited

OTHER PUBLICATIONS

Marshall of Cambridge (Engineering) Ltd., Manual, Rotary Hydraulic Arresting Gear, Retractable Hook Cable Support System and Retractable Platform for Runway Edge Sheaves, Cambridge, England, Jul. 1978, 25 pages.
Marshall of Cambridge (Engineering) Ltd., Specification, Retractable Hook Cable Support System and Retractable Platform for Runway Edge Sheaves, Cambridge, England, Jun. 1978, 6 pages.
US Department of Transportation, Federal Aviation Administration, Advisory Circular No. 150/5220-9A, Aircraft Arresting Systems on Civil Airports, Dec. 20, 2006, 14 pages.

* cited by examiner

Lowered Position

RETRACTABLE RUNWAY EDGE SHEAVE

CROSS REFERENCE TO RELATED APPLICATIONS

This application is related to and claims priority benefits from U.S. Provisional Application Ser. No. 62/666,404, filed on May 3, 2018, entitled "Retractable Runway Edge Sheave with Ramping for use in an Aircraft Arresting System," the entire contents of which are hereby incorporated by this reference.

FIELD OF THE INVENTION

The field of this disclosure relates to a retractable runway edge sheave for use in an aircraft arresting system. The arresting system functions to extend a cable across a runway for capture by a tailhook of an aircraft. The retractable runway edge sheave is designed to raise and lower the cable. It also lifts the tape connector and a portion of the purchase tape above the runway surface. The disclosed system may also feature a ramping system.

BACKGROUND

One type of aircraft arresting system that is used to decelerate an aircraft functions by extending a cable across the runway. These systems are often installed on runways (commercial or military) where aircraft equipped with a tailhook may need to land. In use, the tailhook of the aircraft can engage the cable in order to bring the aircraft to a safe stop in the event of an emergency condition.

A typical aircraft arresting system consists of an energy absorber (braking system) with a reel of tape and a runway edge sheave to align the tape vertically with respect to the runway surface. This is illustrated by FIG. 1. These components are located on opposite sides of the runway, with one set of components on each side. As shown by FIG. 2, the tape, originating from tape reels on the braking system, is fed through the runway edge sheaves. The tapes on either side are connected to a cross-runway cable via a tape connector interface. During an arrestment event, the tape pays out from the reels and travels across the runway.

The current runway edge sheave configuration provides the runway edge sheave/fairlead beam mounted to a concrete foundation along sides of the runway. This installation configuration also typically consists of permanently-installed concrete ramping on either side of the sheaves. This ramping is provided to accommodate accidental or occasional rollover of the runway edge sheave by aircraft. This runway edge sheave and ramping configuration is installed permanently above ground. According to International Civil Aviation Organization (ICAO) recommendations, this permanent above ground configuration is considered an airfield obstruction.

In other systems that remain above ground, the cable is typically supported slightly above the runway (approximately 2 inches), making it more accessible to the aircraft tailhook. Positioning the cable above the runway can help prevent a "hook skip," where the aircraft's tailhook fails to catch the cable. In some systems, this cable support is provided by rubber "donuts" that are spaced along the length of the cable. The donuts lay directly on the runway surface, which exposes the cable to continual run-over by aircraft. This can cause damage to both the cable and to the runway surface. Due to the fact that it creates an obstruction, the donut-supported cable is another type of airfield obstruction.

Some designers have attempted to provide below ground sheave systems. One attempted solution has included a Retractable Hook Cable Support System (RHCSS). Portions of the system are described by materials from Marshall of Cambridge Engineering Ltd. This system can be used to protect the cable and the runway surface by housing the cable in a cross runway trough during standard flight operations. Support boxes are spaced across the width of the runway. Prior to an arrestment event, the boxes raise the cable into position above the runway to allow tail hook engagement. When the cable is not in use, it lies within the cross runway trough. In this lowered position, the retractable hook cable support system is ICAO compliant.

An even earlier example of a below ground system is illustrated by U.S. Pat. No. 3,620,489. In this patent, the inventors provided a below ground sheave system that retracted into a pit prior to activation. The cover was locked in a closed position with the payout element (connected to a cross runway cable) tensioned therebeneath. When an aircraft touched down and engaged the cable, the pretensioned payout element was further tensioned sufficiently during the initial phase of arrestment to exceed the predetermined upward force, which released a latch lock that allowed the cover assembly to rise from the pit in response to the tensioning. Release of the latch elevated the sheave above ground during arrestment. However, the sheave system was not activated until the time that the aircraft touched ground. Raising of the sheave was due to tension alone, not a raising and lowering system.

Even in light of these attempts, there are currently no available runway edge sheave solutions that conform to ICAO guidelines. Earlier attempts at below ground systems have been unsuccessful. Existing runway edge sheave installations are all thus mounted above ground, causing an obstruction and are not compliant with ICAO guidelines. Improvements are desirable.

SUMMARY

According to certain embodiments of this disclosure, there may be provided a retractable sheave system for positioning a cable across an aircraft runway surface, comprising: a foundation comprising a cavity therein, a beam that functions as a sheave configured to be positioned within the cavity, a hinge associated with the beam, a lifting/lowering mechanism associated with the beam, wherein when the lifting/lowering mechanism configures the beam in a lowered position, the beam rests within the cavity and is flush with the aircraft runway surface, and wherein when the lifting/lowering mechanism configures the beam in a raised position, the beam hinges with respect to the hinge such that at least the forward portion of the elongated beam raises above the runway surface. The hinge associated with the beam may be a rear hinge, and when the lifting/lowering mechanism configures the beam in a raised position, the beam hinges with respect to the rear hinge such that the forward portion of the elongated beam raises above the runway surface. In other examples, wherein the hinge associated with the beam may be a side hinge.

The beam may comprise a lifting plate. The foundation may comprise one or more restraint plates for securing the beam in position.

In some examples, there are also provided side ramp portions operatively secured to the beam. Raising of the beam also results is raising of the side ramp portions, and lowering of the beam results is lowering of the side ramp portions. For example, side ramp portions are hinged to sides of the beam, such that raising of the beam results in corresponding raising of the ramp portions. The side ramp portions may be hinged to the beam and are slidable with respect to the foundation. There may be provided guards to cover open spaces between the foundation and ramp portion edges when the beam is raised.

Other examples include the beam as an elongated beam that functions as a runway edge sheave. The beam may have at least one horizontal roller sheave and at least one vertical sheave in order to orient tape moving through the beam.

The lifting/lowering mechanism comprises a pneumatic system, hydraulic system, electrical actuation, or mechanical actuation, or actuation via an airbag system.

There may be a tape connection positioned at a forward portion of the beam.

In other examples, there is provided a retractable sheave system for positioning a cable across an aircraft runway surface, comprising: a foundation comprising a cavity therein, a beam that functions as a sheave configured to be positioned within the cavity, a raising system associated with the beam; wherein when the raising system configures the beam in a lowered position, the beam rests within the cavity and is flush with the aircraft runway surface, and wherein when the raising system configures the beam in a raised position, at least a forward portion of the beam raises above the runway surface. The raising system may comprise a rear hinge and a lifting/lowering mechanism that allows the beam to raise or lower when the lifting/lowering mechanism is activated. The raising system may comprise a hydraulic system, electrical actuation, mechanical actuation, or actuation via an airbag system.

BRIEF DESCRIPTION OF THE DRAWINGS

FIG. 15A shows the beam in its lowered position. FIG. 15B shows the beam in its raised position.

FIG. 16A shows the beam in its lowered position. FIG. 16B shows the beam in its raised position.

DETAILED DESCRIPTION

The described embodiments provide a retractable runway edge sheave system. The disclosed system may be used in conjunction with a retractable hook cable support system (RHCSS). The retractable runway edge sheave system is capable of raising the runway edge sheave above ground and placing it into battery (arrestment ready) position. It can then be retracted (lowered) below grade or flush with the runway in order to meet various regulations or guidelines when not in use. The RHCSS may also raise and lower to match the positioning of the retractable runway edge sheave. These systems work in cooperation with one another. Having a condition where the cable is raised but the sheave is lowered would be considered hazardous to an aircraft with its tailhook lowered for an arrestment. There may be a slight synchronization delay between both systems finding their fully raised or lowered positions, but they are both generally either fully raised or retracted for safe operation The disclosed retractable runway edge sheave is designed to raise the runway edge sheave into the battery position while maintaining the alignment of the tape path to a designed location above the center of the runway. It is necessary to maintain a degree of tension on the cable while in the raised, arrestment ready position, such that it does not sag to the degree that it lays on the runway surface. Typically, runway edge sheaves are aligned to a designed height above the crown or center of the runway surface in the case of a single slope runway. They must also be designed to ensure that they can support sufficient tension maintained on the cable to prevent the cable from sagging onto the runway surface. The tensile force is typically applied by a tape rewind system of the energy absorber and is transmitted through the tape and out to the cross runway cable. The tape should be positioned centrally on the sheaves and not biased toward the edges where rubbing and binding can occur. Such interferences can cause wear to the edges of the tape and a degradation of its strength.

The disclosed retractable runway edge sheave may also feature an optional ramping device that follows the runway edge sheave into the raised and lowered positions. The ramping device may help protect aircraft that have veered off the runway from damage incurred by striking the raised runway edge sheave directly.

Figure 1:
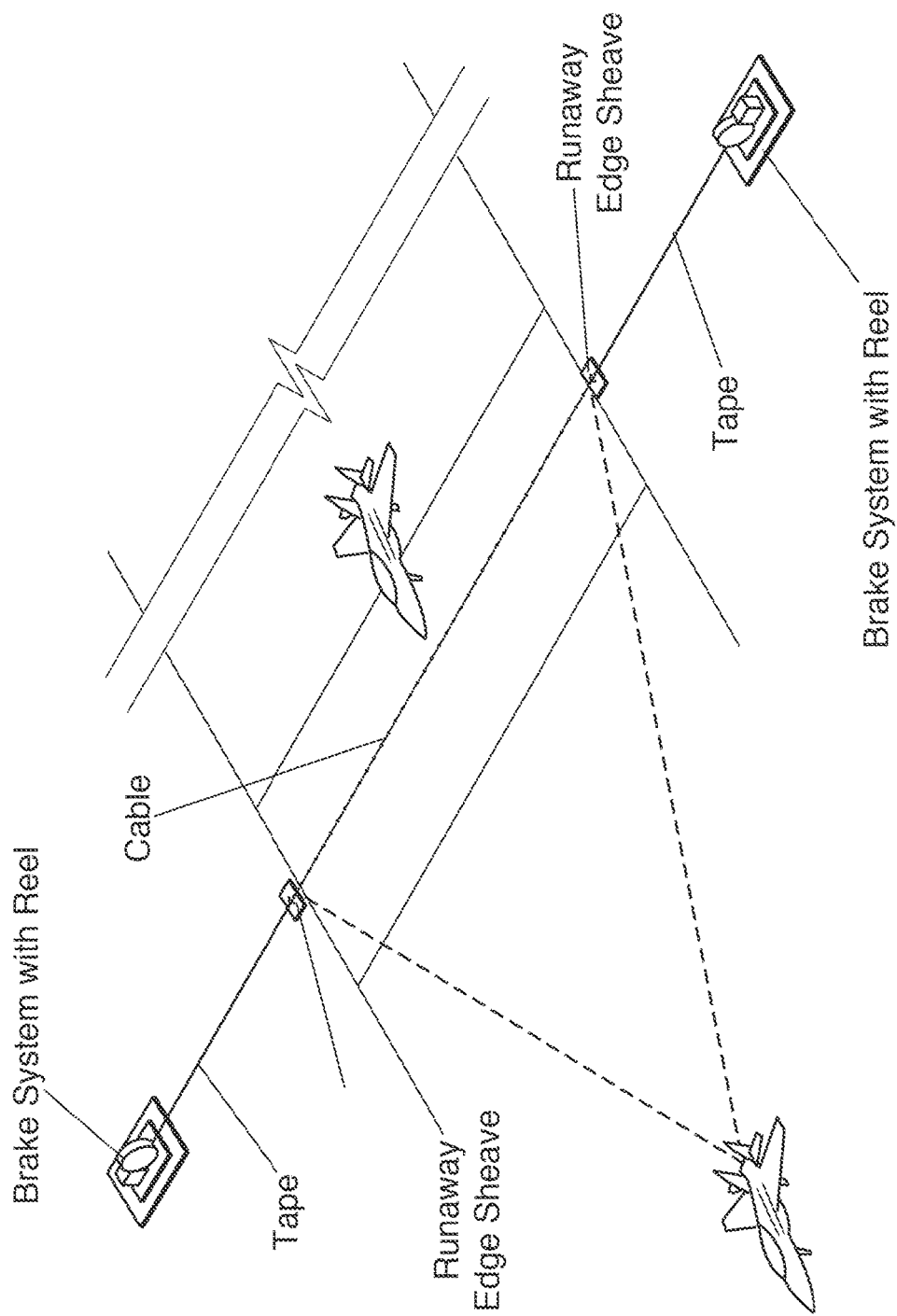
FIG. 1 is a schematic view illustrating an aircraft with a tailhook catching a cross-runway cable.
Figure 2:
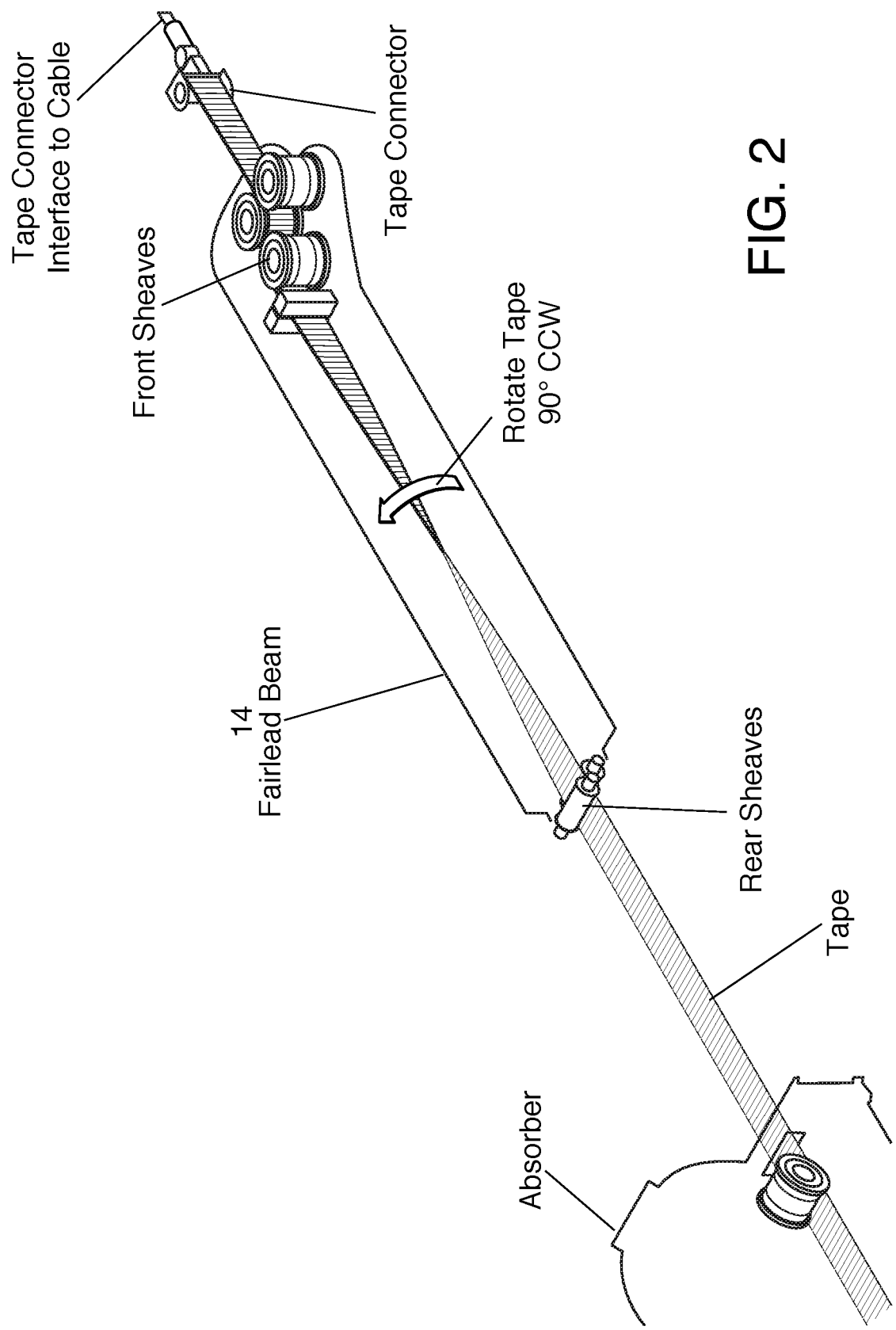
FIG. 2 is a side perspective view of a fairlead beam sheave.

FIG. 2 illustrates one example of an elongated beam 14 that may be used in accordance with this disclosure. Although the beam 14 is generally shown as an elongated member that functions as a runway edge sheave, it should be understood that alternate beam/sheave configurations are possible and considered within the scope of this disclosure. As shown, the beam is a fairlead beam that receives the tape from an energy absorber at a rear sheave that is generally horizontal. A forward set of vertical sheaves may be provided such that the tape is rotated about 90° within the sheave. This can help with alignment of the tape so that the tape connector interface to the cable is positioned as desired.

Figure 3:
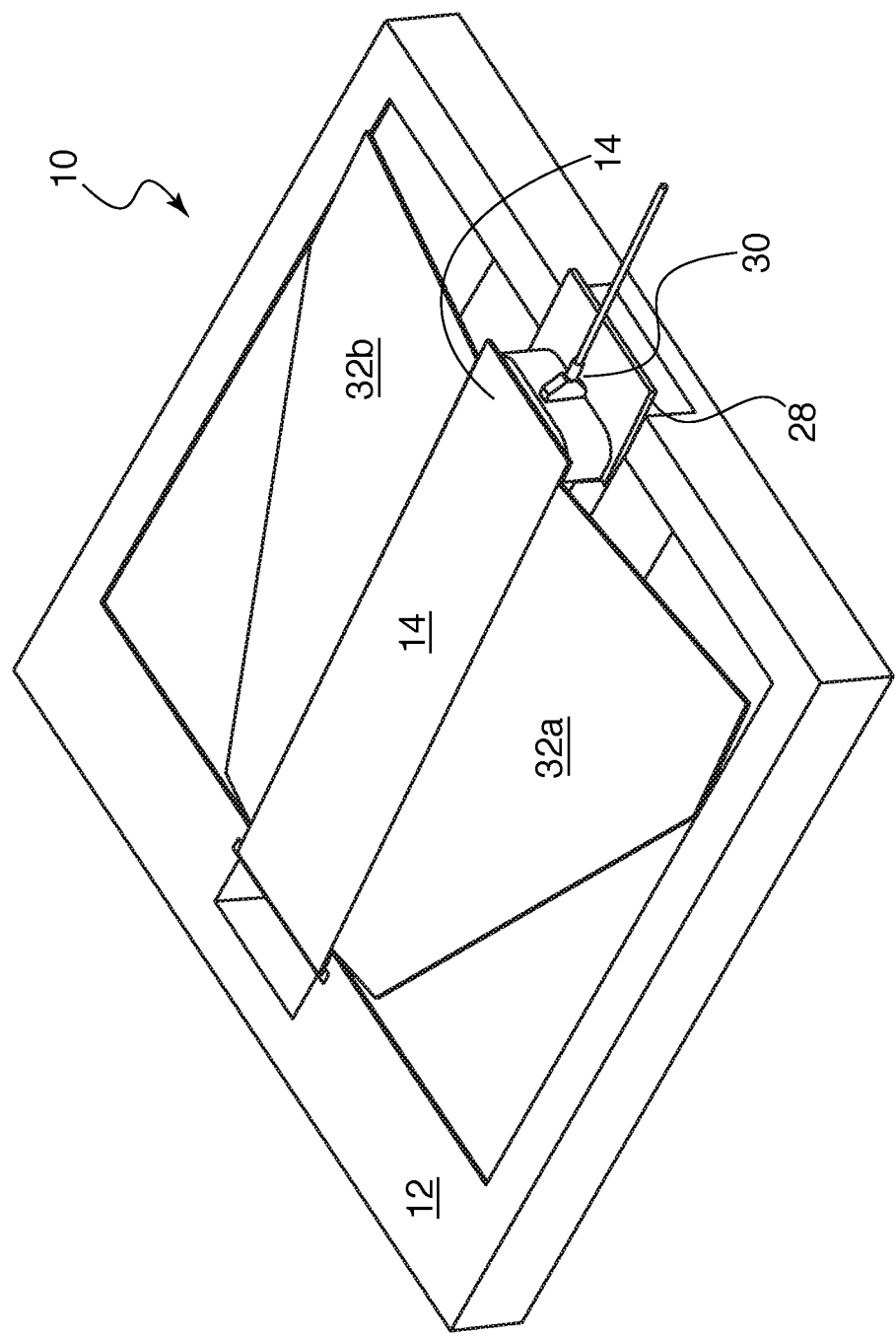
FIG. 3 is a front perspective view of one embodiment of a retractable runway edge sheave in a raised position, as described herein.
Figure 4:
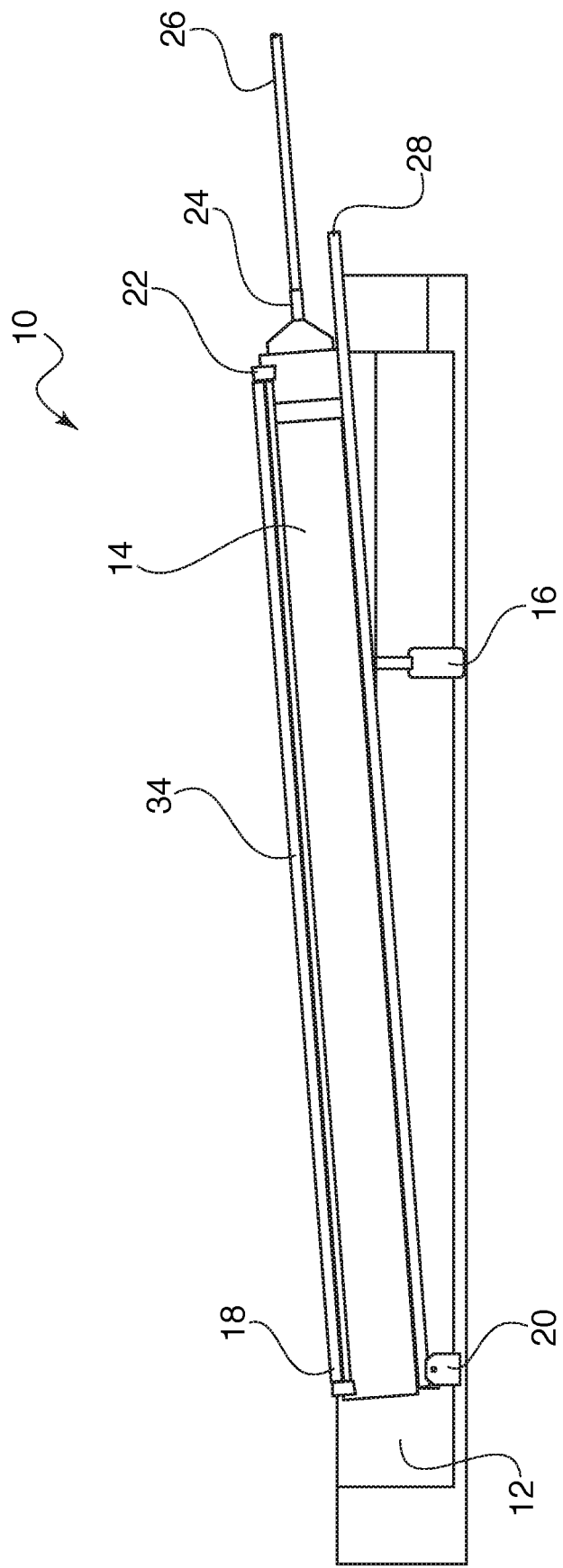
FIG. 4 is a side plan view of FIG. 3.
Figure 5:
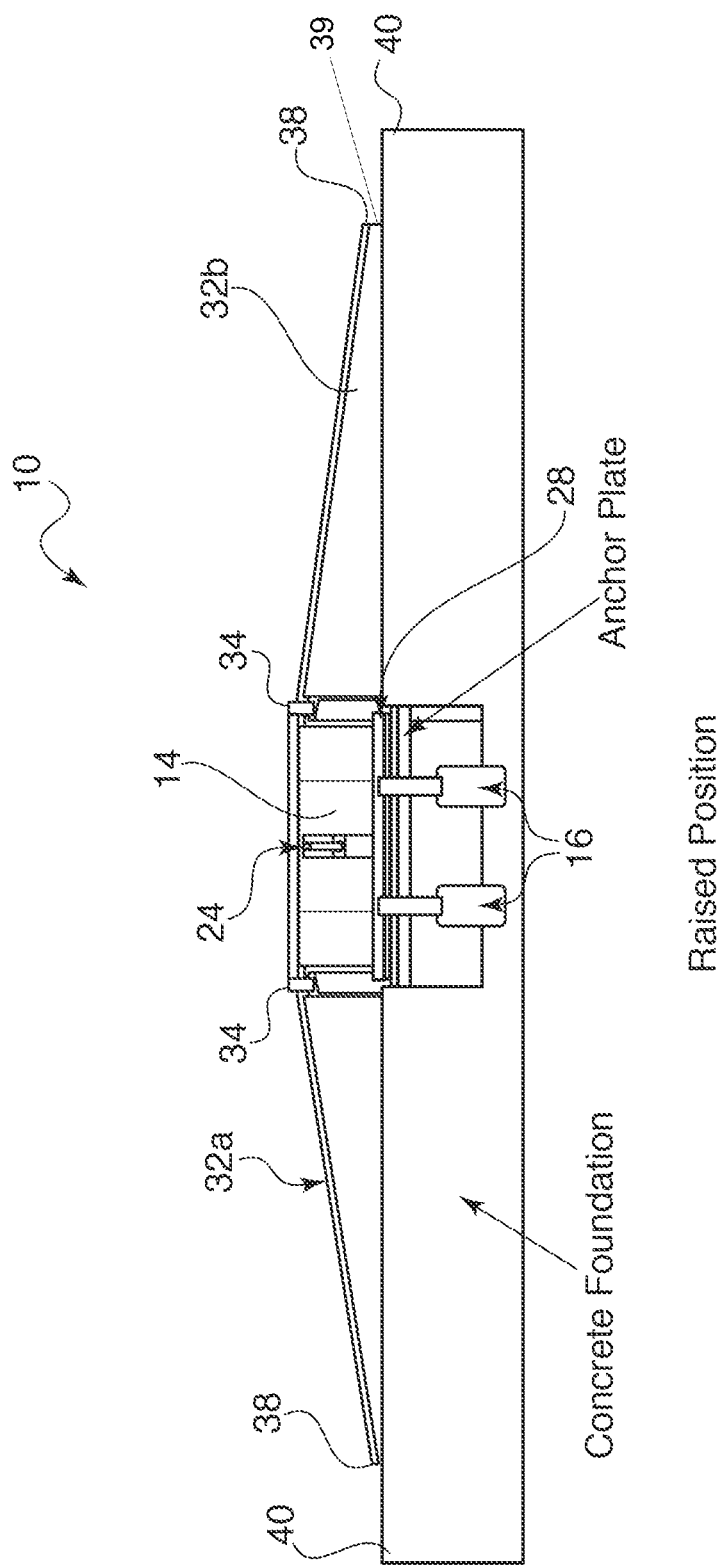
FIG. 5 is a front plan view of FIG. 3.
Figure 6:
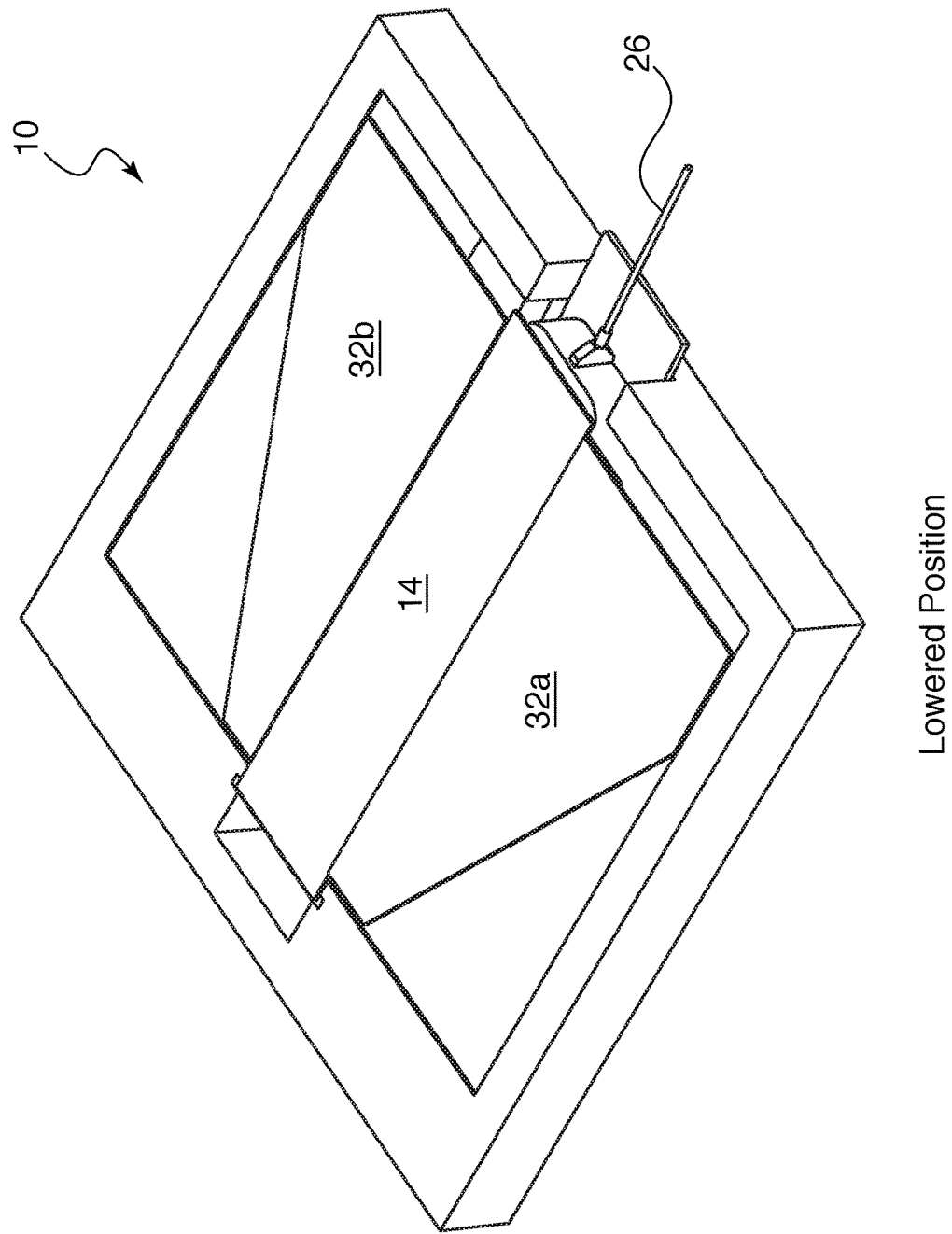
FIG. 6 is a front perspective view of one embodiment of a retractable runway edge sheave in a lowered position, as described herein.
Figure 7:
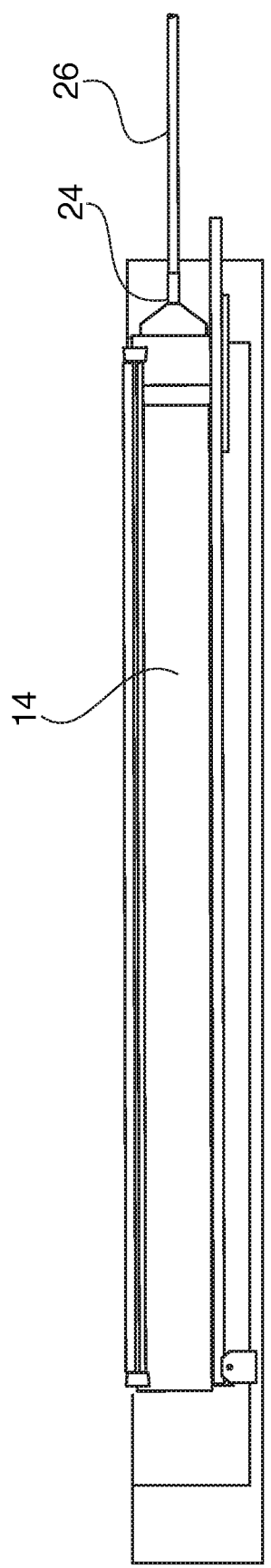
FIG. 7 is a side plan view of FIG. 6.
Figure 8:
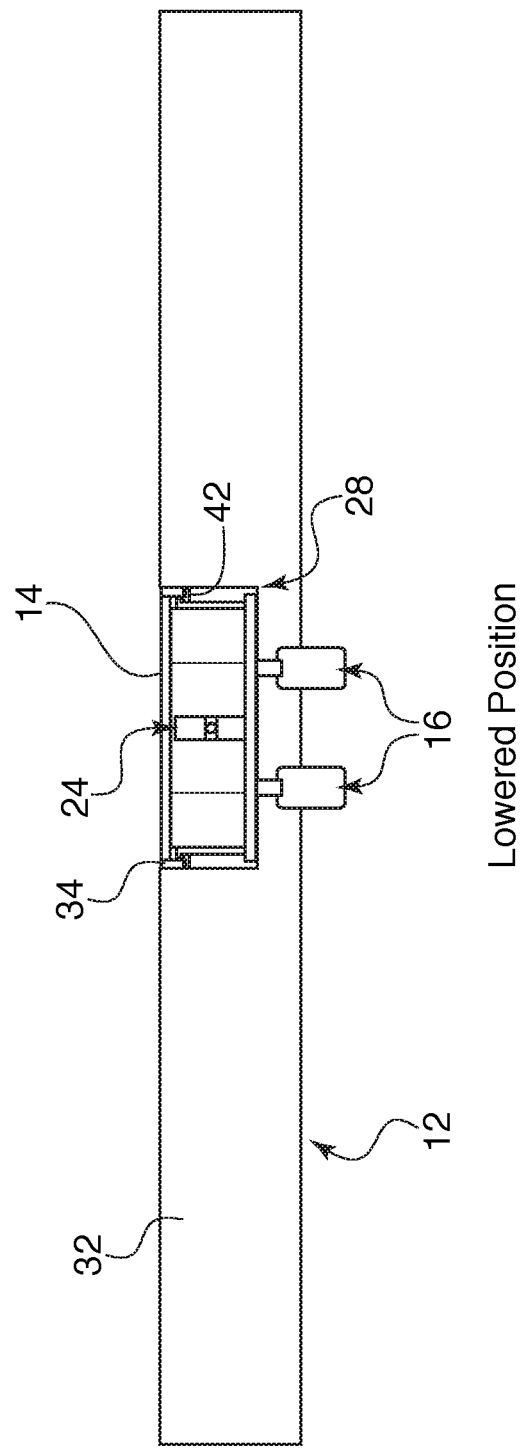
FIG. 8 is a front plan view of FIG. 6.

Referring now to FIG. 3, there is shown a retractable runway edge sheave system 10. The system is configured to be installed within a stable foundation 12. Foundation 12 will typically be a concrete foundation, similar to the type of foundations onto which runway edge sheaves are currently mounted above ground. The foundation 12, however, defines an internal cavity area into which the retractable runway edge sheave system components are mounted. FIGS. 3-5 illustrate the retractable runway edge sheave system 10 in its raised position. FIGS. 6-8 illustrate the retractable runway edge sheave system 10 in its retracted/lowered position.

Referring now to FIGS. 3 and 4, the retractable runway edge sheave system 10 has an elongated beam 14 that functions as the sheave. In specific examples, a fairlead beam may be housed within the elongated beam 14. The elongated beam 14 is raised and lowered within the cavity via a mechanism 16. The mechanism 16 may be a lifting and lowering mechanism that functions via hydraulic operation, pneumatic operation, electrical operation, mechanical operation such as airbag inflation or gear and pulley system, or any other appropriate lifting and lowering system. Although two lifting mechanisms 16 are illustrated by FIG. 5, it should be understood that there may be a single mechanism or multiple mechanisms, depending upon the weight of the system and the design of the raising linkages. Additionally, although mechanisms 16 are illustrated as positioned below elongated beam 14, it is possible that the mechanisms may function from the side or an upper area of the beam. The elongated beam 14 is mounted within the cavity along a rear portion 18 via a hinge 20. When the mechanism 16 is activated, the elongated beam 14 pivots up with respect to the hinge 20. This can be viewed by the side view of FIG. 4. The tape that enters the beam 14 may travel underground in a tube as it is directed to the foundation 12.

A forward portion 22 of the elongated beam 14 has a tape connector 24 onto which the cable 26 is secured. Forward portion 22 of the elongated beam 14 also defines a lifting plate 28. Lifting plate 28 moves along with elongated beam 14. A forward portion of the lifting plate has a lip area 30, which provides a shelf for the tape connector when the system is raised. The lifting plate 28 and lip 30 may fit into a recessed area of the foundation 12.

The figures also illustrate left and right ramp portions 32a, 32b. Ramp portions 32a, 32b may be hinged to sides of the elongated beam 14. FIG. 4 shows a side view of a ramp hinge 34 that secures one of the ramp portions 32 to the elongated beam 14. As shown, the hinge 34 may extend along a substantial length of the beam 14. It is also possible for a series of smaller hinges to be used instead. When the elongated beam 14 is in the raised position, the ramp portions 32a, 32b create an upward slope between the foundation 12 and the beam 14, as illustrated by FIG. 5. This feature can help protect the system 10 in the event that an overrun aircraft rolls over the system 10 (as well as protecting the aircraft and its occupants). As shown, the ramp portions 32a, 32b may have a truncated triangular shape. This shape can help the ramp portions 32a, 32b fit within the footprint of foundation 12, whether the elongated beam 14 is raised or lowered. If provided, the ramps 32 are designed to be raised and lowered along with the system. As illustrated by FIG. 5, as the elongated beam 14 is raised, the outer edges 38 of the ramps are pulled in, toward the elongated beam. This may occur via use of one or more cylindrical rollers that function to track along the base of the foundation 12 and roll inwardly as the ramps are raised.

Upward movement of the elongated beam 14 moves the ramp portions from a flat position illustrated by FIGS. 6-8 to a raised position illustrated by FIGS. 3-5. The triangular shape of the outer edges of the ramp portions are designed to prevent them from lifting off of the foundation surface. One or more guards 39 may be provided along ramp edges 38 to prevent debris from entering the space left between ramp edges 38 and the foundation edge 40.

Upward movement of the elongated beam 14 moves the cable 26 and its tape connection 24 upward and causes the optional ramp portions 32 to track inwardly and raise as well. Raising of the elongated beam 14 and the retractable hook cable system positions the cable 26 properly across the runway. When the elongated beam 14 is lowered, the upper surface of the beam is flush with the runway surface. This moves the cable 26 to also be either flush or below with the runway surface.

Referring now to FIGS. 6-9, there is shown a view of the elongated beam 14 a lowered position. Lowering of the elongated beam 14 may be accomplished via lowering of the lifting/lowering mechanism 16. When lowered, the ramp portions 32 are also flush with the runway surface.

Figure 9:
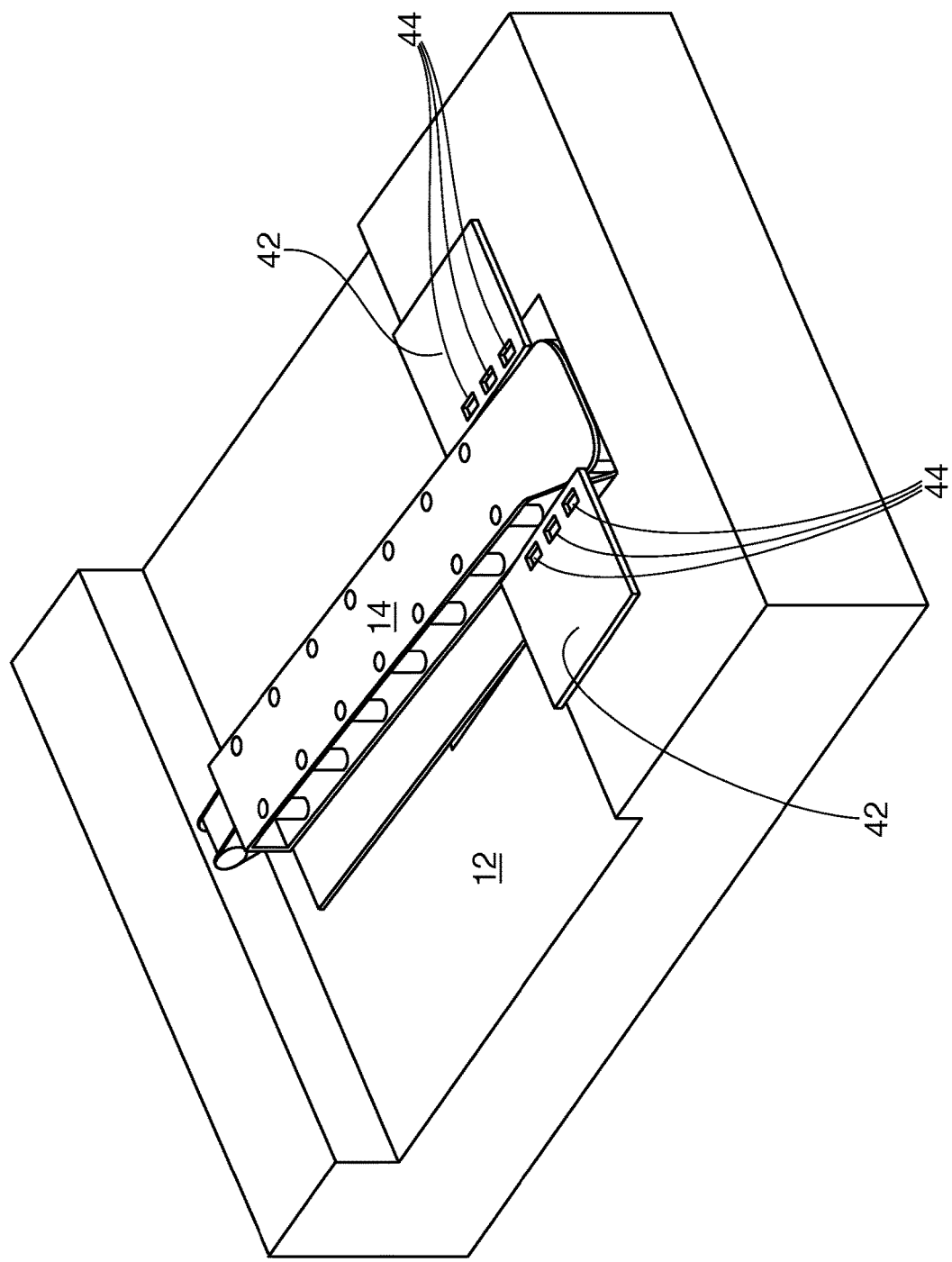
FIG. 9 illustrates one embodiment of an elongated beam in the lowered position, with ramp portions removed for ease of illustration.

FIGS. 8-9 show one example of a relationship between elongated beam 14 and side restraint plates 42. Side restraint plates 42 may be used to help secure the elongated beam 14 when in the raised position so that when an aircraft engages the cable, all of the loading is properly managed. FIG. 9 shows the elongated beam without the ramp portions 32 for ease of review. Side restraint plates 42 remain stationary with respect to the foundation 12. In the examples shown, side restraint plates 42 have beam-facing securement portions 44. The securement portions 44 shown may be one or more openings configured to receive one or more corresponding securement portions 46 associated with the elongated beam. As illustrated, the corresponding securement portions 46 may be a series of keys or protrusion 46 associated with the elongated beam 14. It should be understood, however, that this configuration may be reversed, such that the securement portions 44 on the restraint baseplate may be teeth or protrusions that are received by corresponding securement portions that form openings associated with the elongated beam. It should also be understood that a single elongated opening may be provided that receives a single elongated protrusion. The side restraint plates may be vertically located inside of the cavity. In this configuration, the side restraint plates may be located along the side wall of the lower portion of the elongated beam 14. This contact between the lower portion of the elongated beam side wall and the vertical restraint plates can resist the lateral forces.

The general goal is that the portions 44, 46 mate or nest with respect to one another in order to secure the elongated beam 14 in a stable configuration. As shown, the corresponding securement portions 46 are formed as teeth/protrusions 46. These teeth/protrusions may be associated with the elongated beam or otherwise positioned along the beam.

Figure 10:
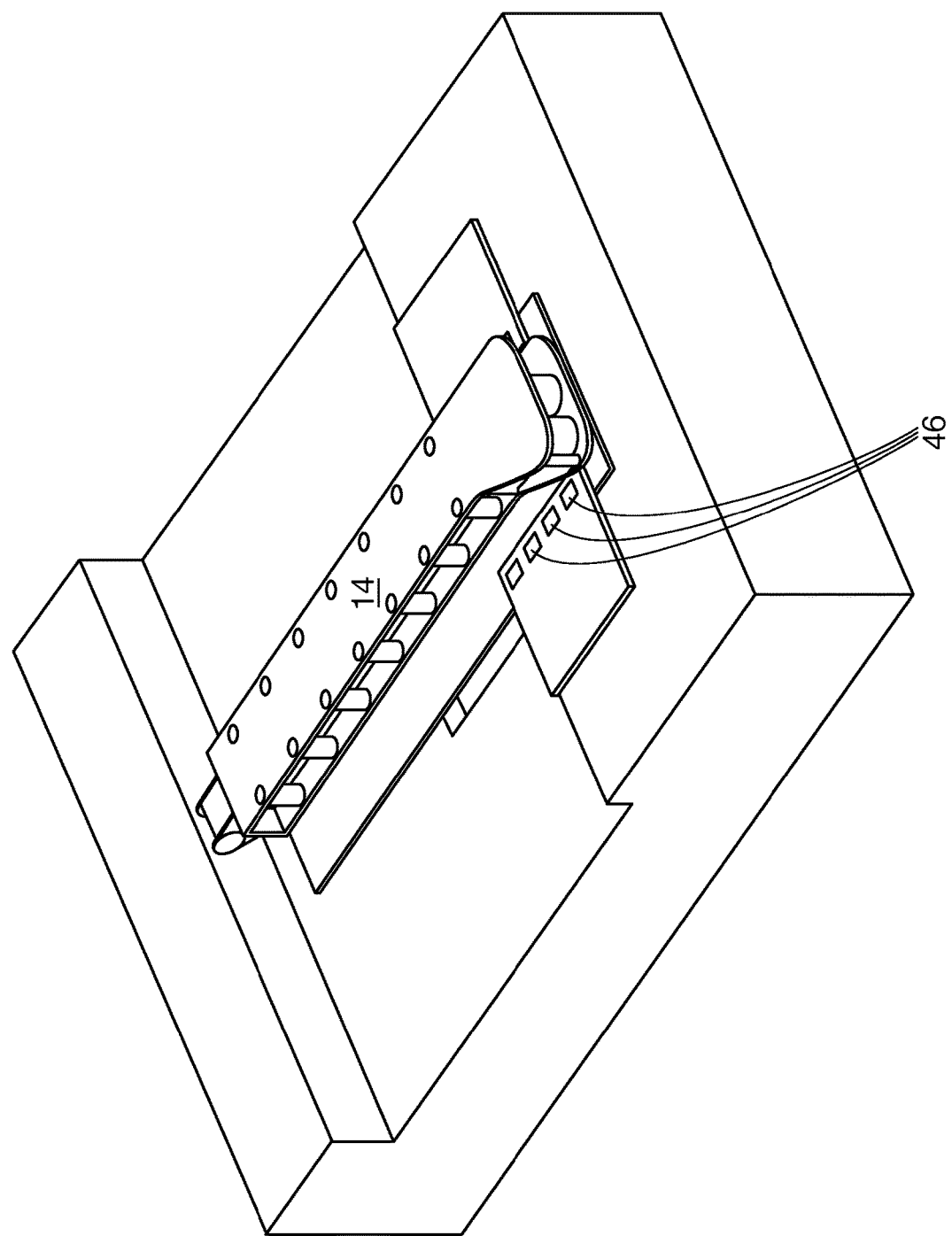
FIG. 10 illustrates the elongated beam of FIG. 9 in the raised position.
Figure 11A:
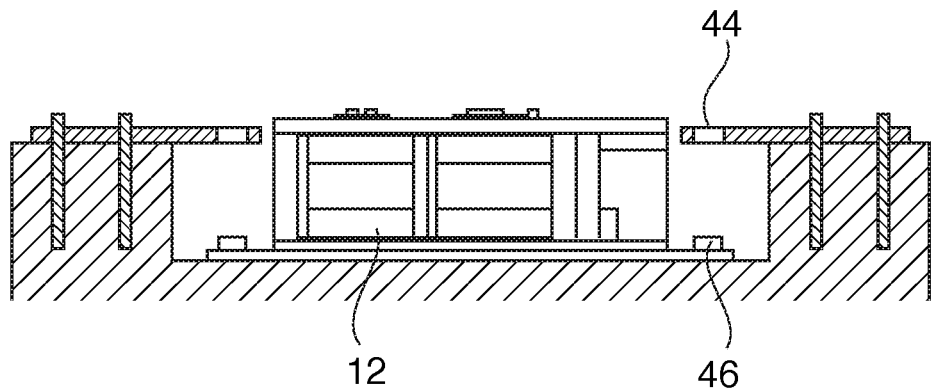
FIG. 11A illustrates a front perspective view of the elongated beam of FIG. 9.
Figure 11B:
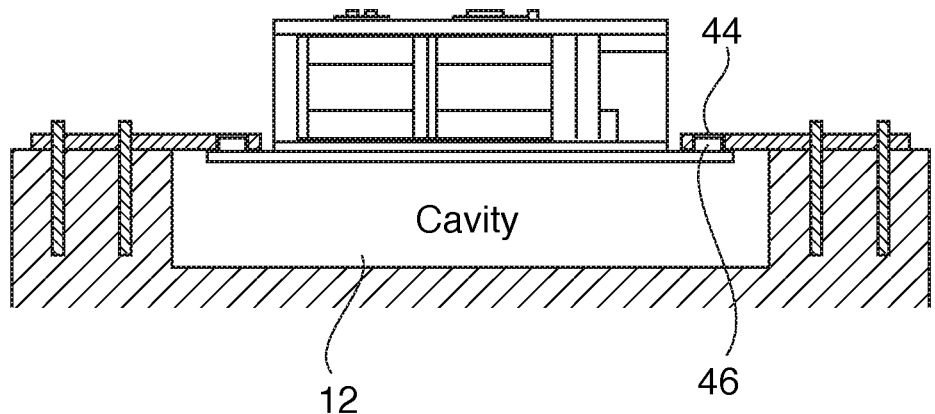
FIG. 11B illustrates a front perspective view of the elongated beam of FIG. 10.

FIG. 10 illustrates the elongated beam 14 of FIG. 9 in a raised position (again, without the ramp portions 32 for ease of review). In use, as the elongated beam 14 is raised, the securement portions 44, 46 nest or interlock with respect to one another. In a specific example shown, the openings of the side restraint plates 42 receive protrusions of the enclosure baseplate. In a specific example, the teeth/protrusions may be beveled along their top edge so that they may find their way into the openings even if the alignment is not exact. Once the elongated beam is raised, the cooperation between the securement portions 44, 46 secures and anchors and the bolts the elongated beam 14 in place. This configuration takes the place of anchor bolts which are typically used to secure the elongated beam to a concrete foundation. FIGS. 11A and 11B illustrate the lowered and raised configuration of the elongated beam 14 and how the securement portions 44, 46 may cooperate with one another.

Figure 12:
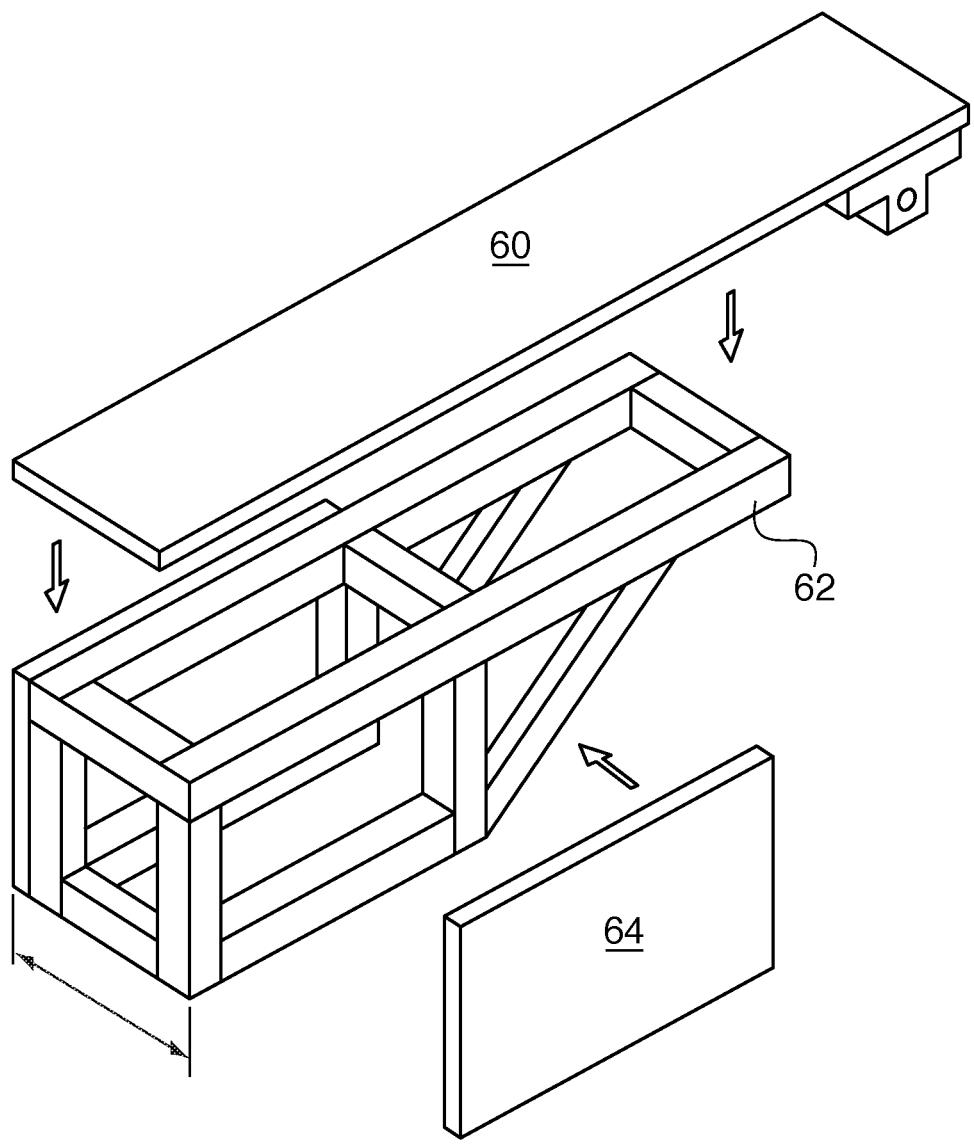
FIG. 12 illustrates a top perspective view of an alternate embodiment for securing the elongated beam into the foundation cavity.

Other embodiments for supporting the elongated beam in place may be providing one or more weldments underneath the elongated beam that use the side of the foundation for resisting lateral loads. For example, as shown by FIG. 12, it is possible to provide a baseplate 60 that can be welded or otherwise attached to the underside of the elongated beam 14. Supporting framework 62 may also be provided to help guide the elongated beam 14 into the raised position while supporting the arrestment loads. The supporting framework 62 may be contained within the cavity of the concrete foundation. A side plate 64 may be secured within the supporting framework 62. The side plate 64 may be steel and covered on its outside surfaces with a low friction material in order to provide a low friction material that allows the beam 14 to slide within the supporting frame work 62.

Figure 13:
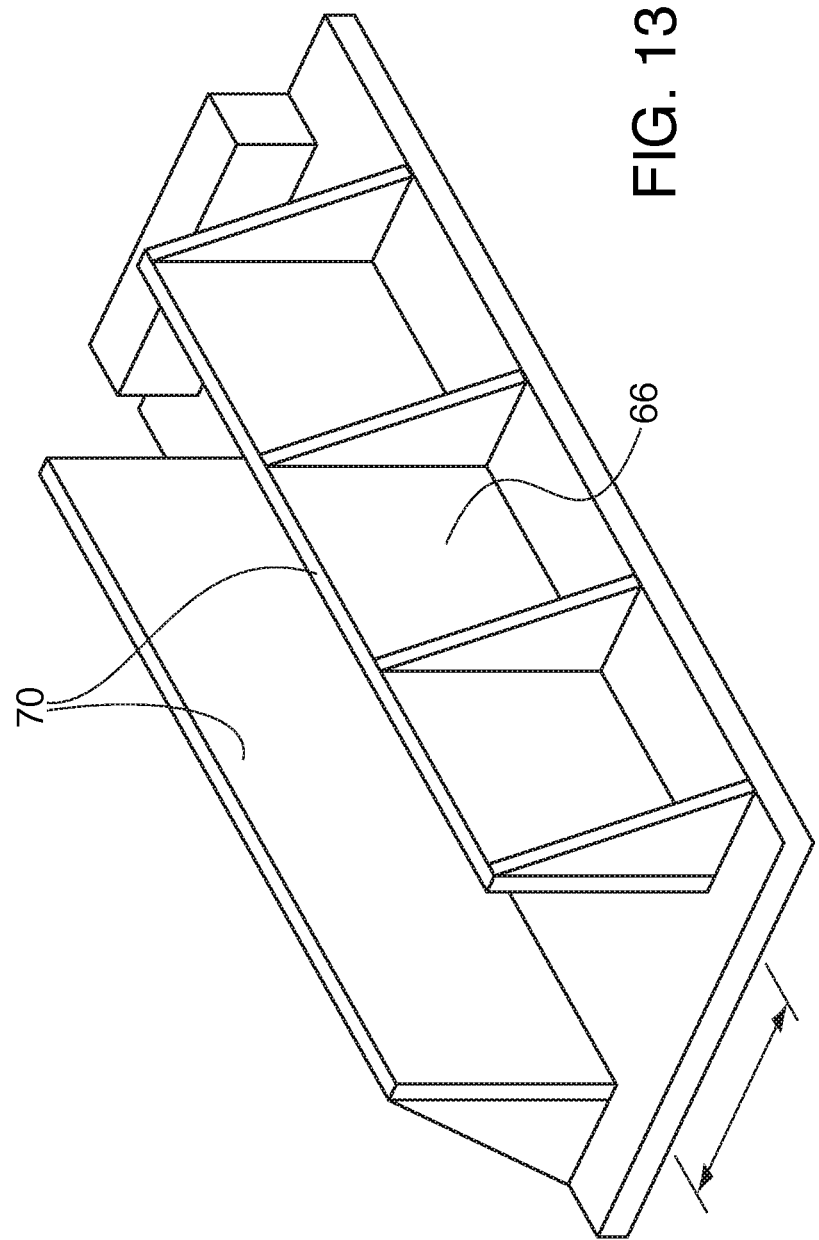
FIG. 13 illustrates an alternate perspective view of an alternate embodiment for securing the elongated beam into the foundation cavity.

As illustrated further by FIG. 13, restraint plates may be side plates 70 that are vertically located inside the cavity. A frame weldment 66 may be secured within the concrete foundation. The supporting framework (not shown in this image) may then be positioned within the frame weldment 66. In this example, the side restraint plates 70 may be located along the side wall of the lower portion of the elongated beam 14. Contact between the lower portion of the elongated beam side wall and the vertical side plates 64 can help resist the lateral forces applied during an aircraft arrestment.

Figure 14:
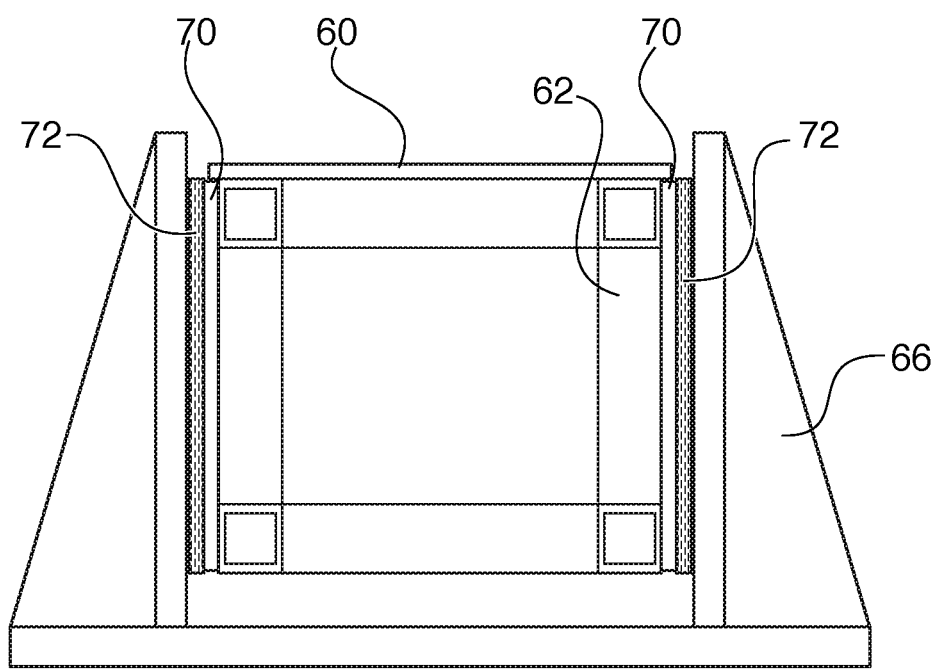
FIG. 14 illustrates a front plan view of the embodiment of FIG. 13.

FIG. 14 shows an end view of FIG. 13 with the frame weldment 66 positioned within the foundation. Supporting framework 62 is then positioned within the frame weldment 66 Side plates 70 may be attached to both sides of the supporting framework 62. The side plates 70 may have a low friction material 72 applied thereto. The elongated beam 14 then has a baseplate 60 secured thereto and is positioned within the supporting framework 62. Other securement and movement options are possible and considered within the scope of this disclosure.

After the arrestment has taken place, there may be a manual reset of the cable if necessary. Alternatively, the control tower may issue a signal to lower the elongated beam 14 to the ground.

Figure 15A:
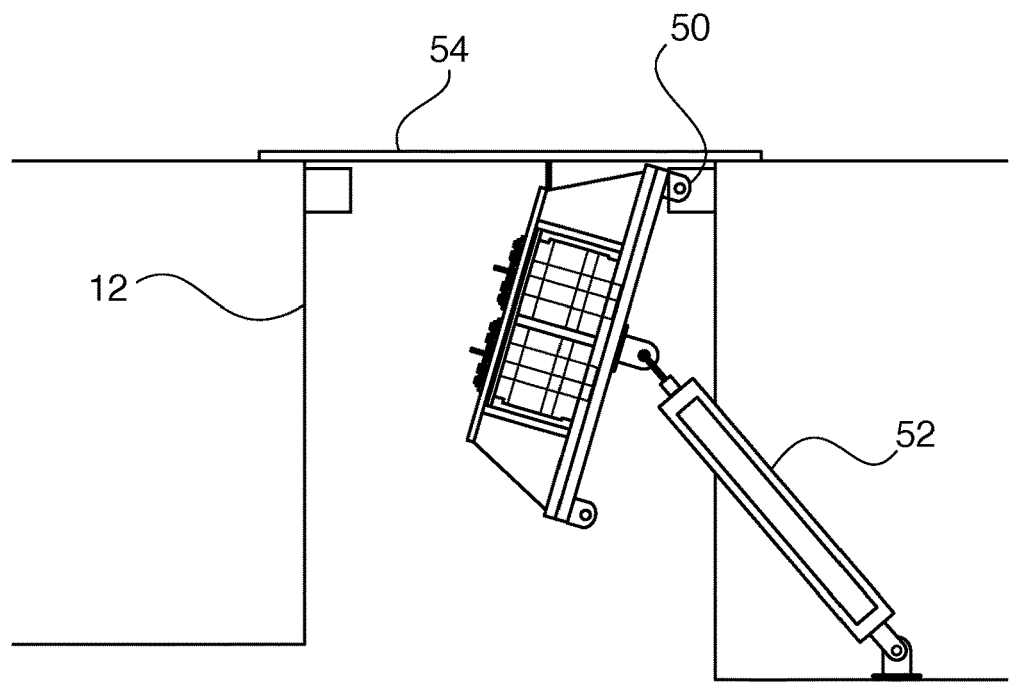
FIGS. 15A and 15B illustrate alternate embodiments of a side hinged elongated beam.
Figure 15B:
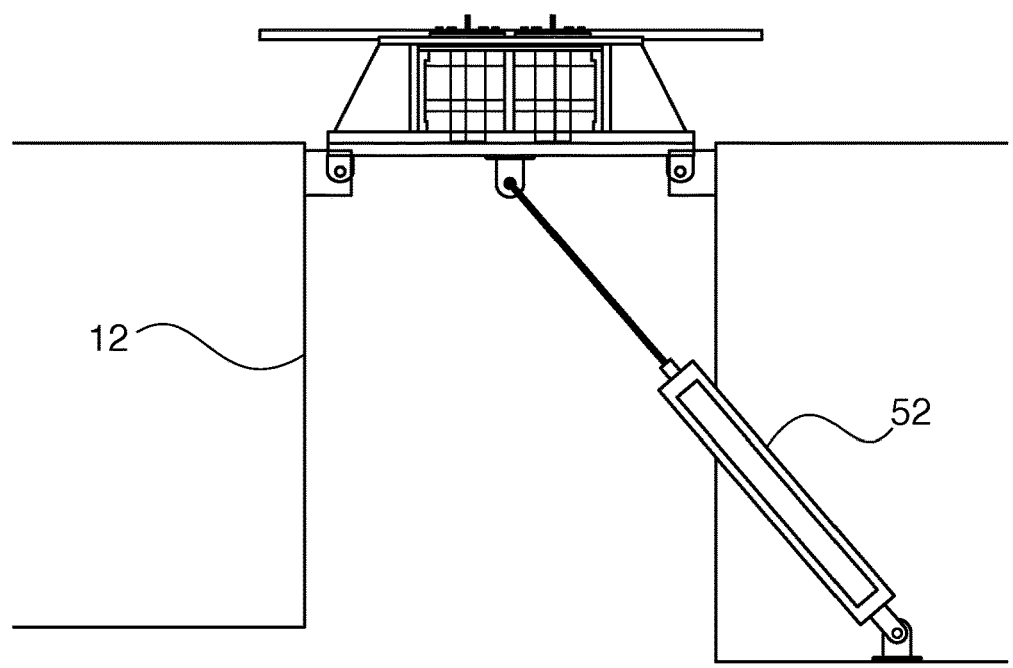

Although certain embodiments have been shown and described, it should also be understood that alternate options are possible and considered within the scope of this disclosure. For example, a further embodiment is illustrated by FIGS. 15A and 15B. Rather than hinging the elongated beam 14 at the rear portion as shown, the beam may work along a side hinge 50. For example, an actuator 52 (similar to the lifting and lowering mechanism 16) may be used to provide a side force to move the elongated beam 14 from a lowered position within the cavity of the foundation 12 (as illustrated by FIG. 15A) to a raised battery position (as illustrated by FIG. 15B). A separate side securement may be implemented in order to maintain the elongated beam in the raised position. A cover 54 may be provided over the top of the elongated beam to protect from debris infiltration an aircraft rollover to the unit while it is retracted.

Figure 16A:
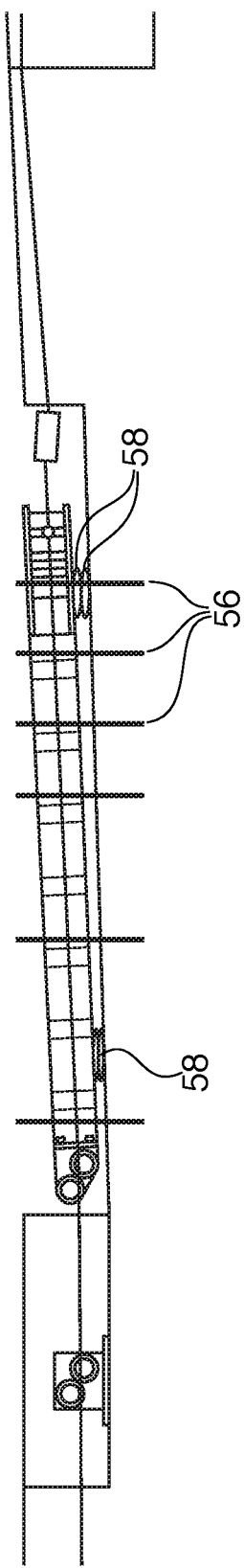
FIGS. 16A and 16B illustrate alternate embodiments of an elongated beam that remains parallel to the runway in its lowered position as well as in its raised position.
Figure 16B:
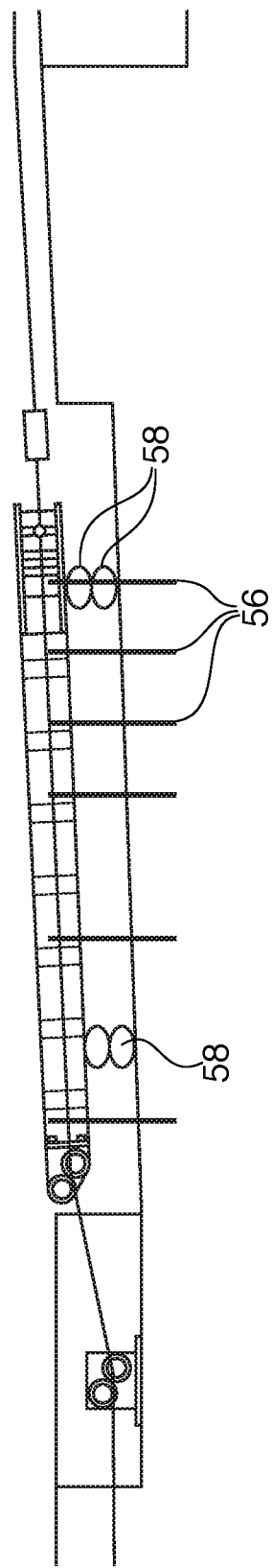

A further alternate embodiment raises and lowers the entire elongated beam 14, so that the entire beam remains parallel to the runway surface, whether raised into a battery position or lowered into the foundation cavity. It is possible to provide an elongated beam that can be raised as a whole, rather than hinged the back. In this embodiment, the elongated beam would remain parallel to the ground. This embodiment does not have a hinge 20 at the rear portion, but may use any type of lifting and lowering mechanism as described herein. One example is illustrated by FIGS. 16A and 16B. In one embodiment of this example, the system may be guided by a series of rods 56 mounted to the foundation 12 that ride in bearings contained on the beam plate. This embodiment can be revised to use the securement portions 44, 46 described above. A lifting and lowering mechanism or actuator may be provided. This may be a hydraulic cylinder or any other type of actuation mechanism. Alternatively, the actuation force may be supplied by airbags 58 located under the elongated beam.

Figure 17A:
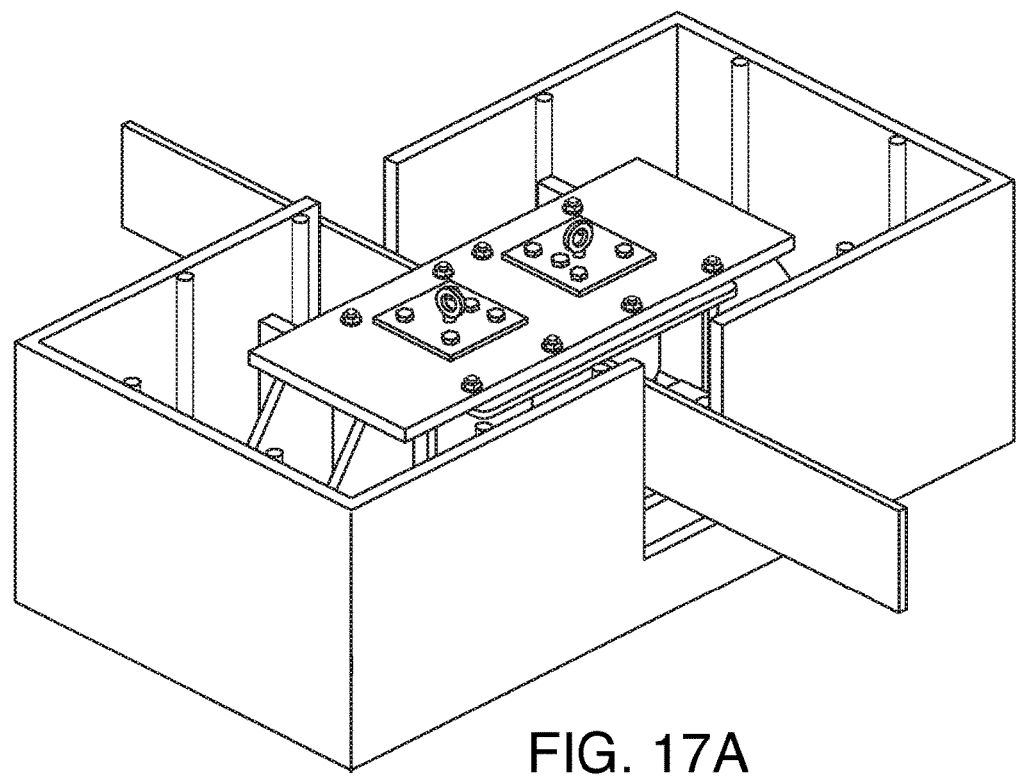
FIGS. 17A and 17B illustrate alternate embodiments of pop-up sheaves.
Figure 17B:
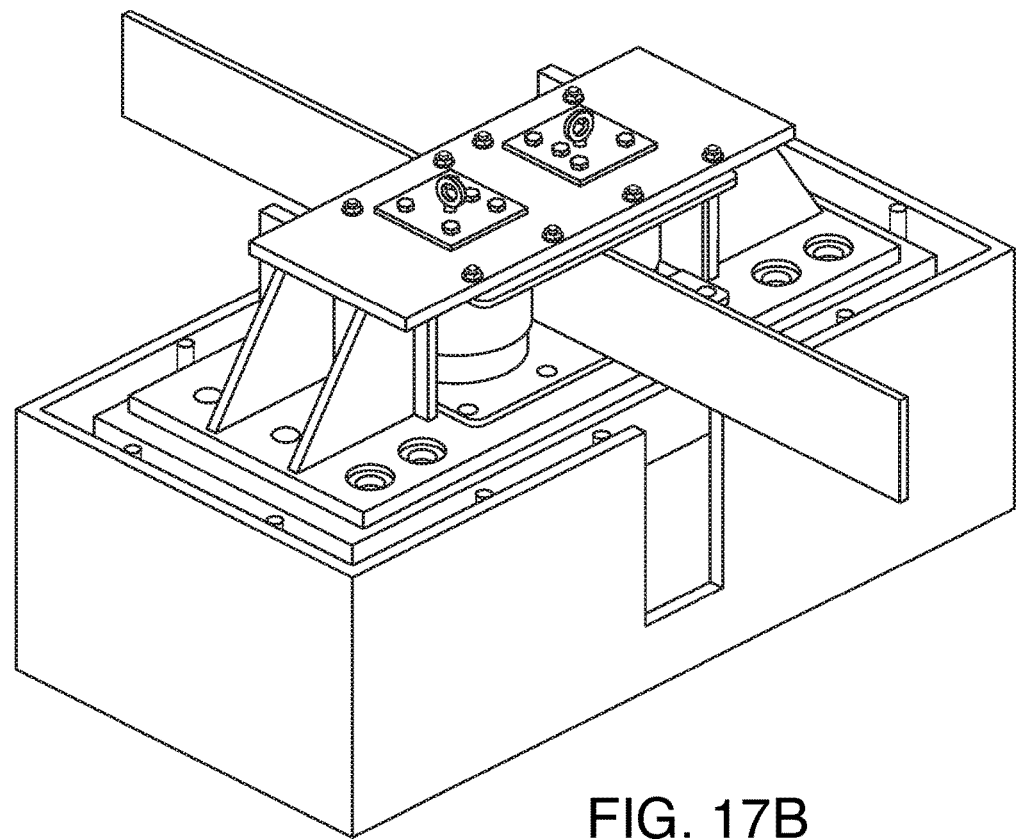

A further embodiment provides a pop-up sheave as illustrated by FIGS. 17A and 17B. In this example, the beam may be provided within an enclosure and raised vertically on roller bearings. The intent is to raise and lower the beam within the enclosure box. This embodiment may provide vertically-oriented sheaves contained within an assembly that are separate from horizontal sheaves. During an arrestment event, the vertical sheaves would travel up into the desired position by a force supplied from below (which may either be the lifting and lowering mechanism/actuator, or airbags, or any other appropriate actuation mechanism). The sheave assembly would have guides, such as linear bearings, and/or be confined within the enclosure to ensure that it raises and lowers predictably and to provide the proper tape alignment with respect to the runway target. A top cover may also be provided to ride up and down with the sheave beam.

The subject matter of certain embodiments of this disclosure is described with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

It should be understood that different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A retractable sheave system for positioning a cable across an aircraft runway surface, comprising:
 a foundation comprising a cavity therein,
 a beam configured to be positioned within the cavity, wherein the beam comprises at least one roller sheave in order to orient tape moving through the beam;
 a hinge associated with the beam;
 a lifting/lowering mechanism associated with the beam and configured as an adjustable support beneath the beam;
 wherein when the lifting/lowering mechanism configures the beam in a lowered position, the beam rests within the cavity and is flush with the aircraft runway surface, and wherein when the lifting/lowering mechanism configures the beam in a raised position, the beam hinges with respect to the hinge such that at least a forward portion of the beam raises above the runway surface.

2. The system of claim 1, wherein the hinge associated with the beam comprises a rear hinge, and wherein when the lifting/lowering mechanism configures the beam in a raised position, the beam hinges with respect to the rear hinge such that the forward portion of the elongated beam raises above the runway surface.

3. The system of claim 1, wherein the beam comprises a lifting plate.

4. The system of claim 1, wherein the foundation comprises one or more restraint plates for securing the beam in position.

5. The system of claim 1, further comprising side ramp portions operatively secured to the beam.

6. The system of claim 5, wherein raising of the beam comprises raising of the side ramp portions and wherein lowering of the beam comprises lowering of the side ramp portions.

7. The system of claim 5, wherein the side ramp portions are hinged to the beam such that outer edges of the side ramp portions are slidable with respect to the foundation such that the outer edges are pulled in toward the beam as the beam is raised.

8. The system of claim 5, wherein the side ramp portions are hinged to sides of the beam, such that raising of the beam results in corresponding raising of the side ramp portions.

9. The system of claim 5, further comprising guards to cover open spaces between the foundation and side ramp portion edges when the beam is raised.

10. The system of claim 1, wherein the beam comprises an elongated beam that functions as a runway edge sheave.

11. The system of claim 1, wherein the beam comprises at least one horizontal roller sheave and at least one vertical sheave in order to orient tape moving through the beam.

12. The system of claim 1, wherein the lifting/lowering mechanism comprises a pneumatic system, hydraulic system, electrical actuation, or mechanical actuation, or actuation via an airbag system.

13. The system of claim 1, further comprising a tape connection positioned at a forward portion of the beam.

14. A retractable sheave system for positioning a cable across an aircraft runway surface, comprising:
a foundation comprising a cavity therein,
a beam configured to be positioned within the cavity, wherein the beam comprises at least one roller sheave configured to orient tape moving through the beam;
a hinge associated a rear portion of the beam;
a lifting/lowering mechanism associated with the beam and configured as an adjustable support beneath the beam;
side ramp portions hinged to sides of the beam, the side ramp portions having outer edges that are slidable with respect to the foundation;
wherein when the lifting/lowering mechanism configures the beam in a lowered position, the beam rests within the cavity and the beam and side ramp portions are flush with the aircraft runway surface, and wherein when the lifting/lowering mechanism configures the beam in a raised position, the beam hinges with respect to the hinge such that at least a forward portion of the beam raises above the runway surface and wherein the side ramp portions are raised.

* * * * *

UNITED STATES PATENT AND TRADEMARK OFFICE
CERTIFICATE OF CORRECTION

PATENT NO. : 11,136,142 B2  
APPLICATION NO. : 16/402608  
DATED : October 5, 2021  
INVENTOR(S) : Christopher J. Levesque et al.

Page 1 of 1

It is certified that error appears in the above-identified patent and that said Letters Patent is hereby corrected as shown below:

On the Title Page

Please delete the Inventors (72):
"Christopher J. Levesque, Glenolden, PA (US); Daniel Glenn Warrick, Philadelphia, PA (US); Kirk F. Schneider, Springfield, PA (US); Kenneth J. Neeld, West Chester, PA (US)"
And insert:
--Christopher J. Levesque, Glenolden, PA (US); Daniel Glenn Warrick, Philadelphia, PA (US); Kirk F. Schneider, Springfield, PA (US); Kenneth J. Neeld, West Chester, PA (US); Travis Chaney, Aston, PA (US); Pete Ferry, Aston, PA (US)--

Signed and Sealed this  
Eighth Day of February, 2022

Drew Hirshfeld  
*Performing the Functions and Duties of the*  
*Under Secretary of Commerce for Intellectual Property and*  
*Director of the United States Patent and Trademark Office*